(12) United States Patent
Halford et al.

(10) Patent No.: US 6,986,313 B2
(45) Date of Patent: Jan. 17, 2006

(54) DUAL MATERIAL AGRICULTURAL DELIVERY SYSTEM FOR SEEDER

(75) Inventors: James William Halford, Indian Head (CA); Frederick Nicholas Butuk, Insinger (CA); Derek Christopher Opseth, Indian Head (CA)

(73) Assignee: Vale Farms Ltd., Indian Head (CA)

( * ) Notice: Subject to any disclaimer, the term of this patent is extended or adjusted under 35 U.S.C. 154(b) by 93 days.

(21) Appl. No.: 10/654,612

(22) Filed: Sep. 4, 2003

(65) Prior Publication Data

US 2005/0045080 A1   Mar. 3, 2005

(51) Int. Cl.
*A01C 7/00*   (2006.01)

(52) U.S. Cl. .................. 111/186; 111/52; 111/151; 172/260.5; 172/265

(58) Field of Classification Search ........... 111/186, 111/187, 151, 194, 147, 52; 172/260.5, 261, 172/264, 265, 266
See application file for complete search history.

(56) References Cited

U.S. PATENT DOCUMENTS

| | | | | |
|---|---|---|---|---|
| 2,230,331 A | * | 2/1941 | Mobley | 111/186 |
| 2,249,874 A | * | 7/1941 | White | 111/62 |
| 2,861,527 A | * | 11/1958 | Phillips | 111/186 |
| 3,804,036 A | * | 4/1974 | Seifert, Jr. | 111/174 |
| 4,202,474 A | * | 5/1980 | Dreyer | 222/609 |
| 4,520,742 A | * | 6/1985 | Anderson | 111/155 |
| 4,762,075 A | | 8/1988 | Halford | |
| 5,161,472 A | * | 11/1992 | Handy | 111/73 |
| 5,331,907 A | | 7/1994 | Beaujot | |
| 5,396,851 A | | 3/1995 | Beaujot | |
| 5,947,209 A | | 9/1999 | Halford et al. | |
| 6,142,085 A | | 11/2000 | Drever et al. | |

OTHER PUBLICATIONS

Paper entitled Fertilizer Placement for Small Grains by Heinonen et al dated Apr. 15, 1978 (7 pages).

* cited by examiner

Primary Examiner—Victor Batson
(74) Attorney, Agent, or Firm—Adrian D. Battison; Michael R. Williams; Ryan W. Dupuis

(57) ABSTRACT

A compression system for a dual material delivery assembly for mounting on a frame alongside a plurality of similar assemblies is described. The assembly includes a furrowing knife for producing a furrow in the ground as it is towed across the ground. A fertilizer tube is mounted behind the furrowing knife. A seed dispensing tube provided is for depositing seed in the furrow behind the fertilizer knife offset to one side and above the fertilizer. A packer wheel is attached to the seed tube assembly. The fertilizer knife and the seed tube assembly are separately mounted on a bracket attached to the implement frame for pivotal movement about a common pivot Two separate cylinders are provided to apply a separate force on the furrowing element and the packer wheel. The cylinders of each of the assemblies are commonly connected for common adjustment on the frame or on the go on a tractor towing the frame.

34 Claims, 7 Drawing Sheets

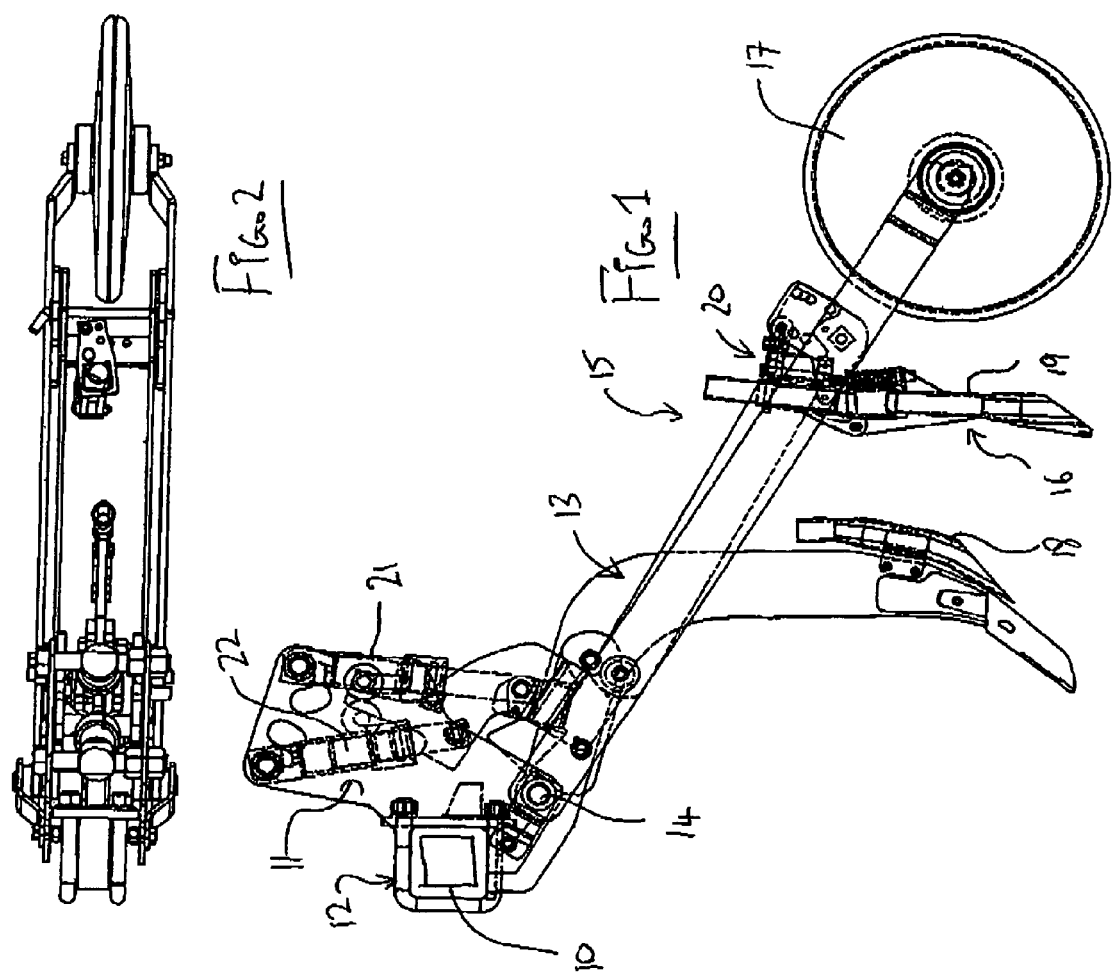

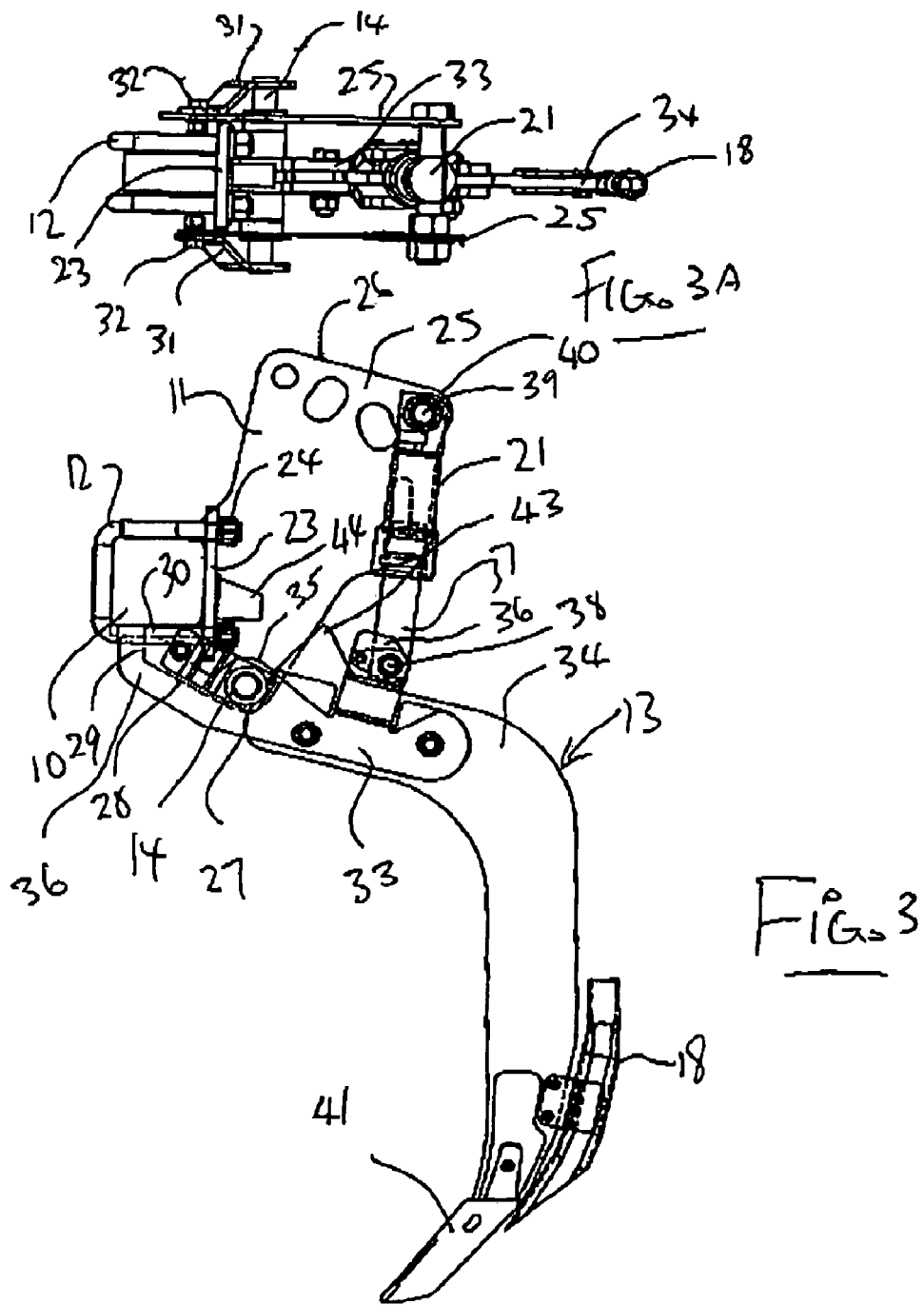

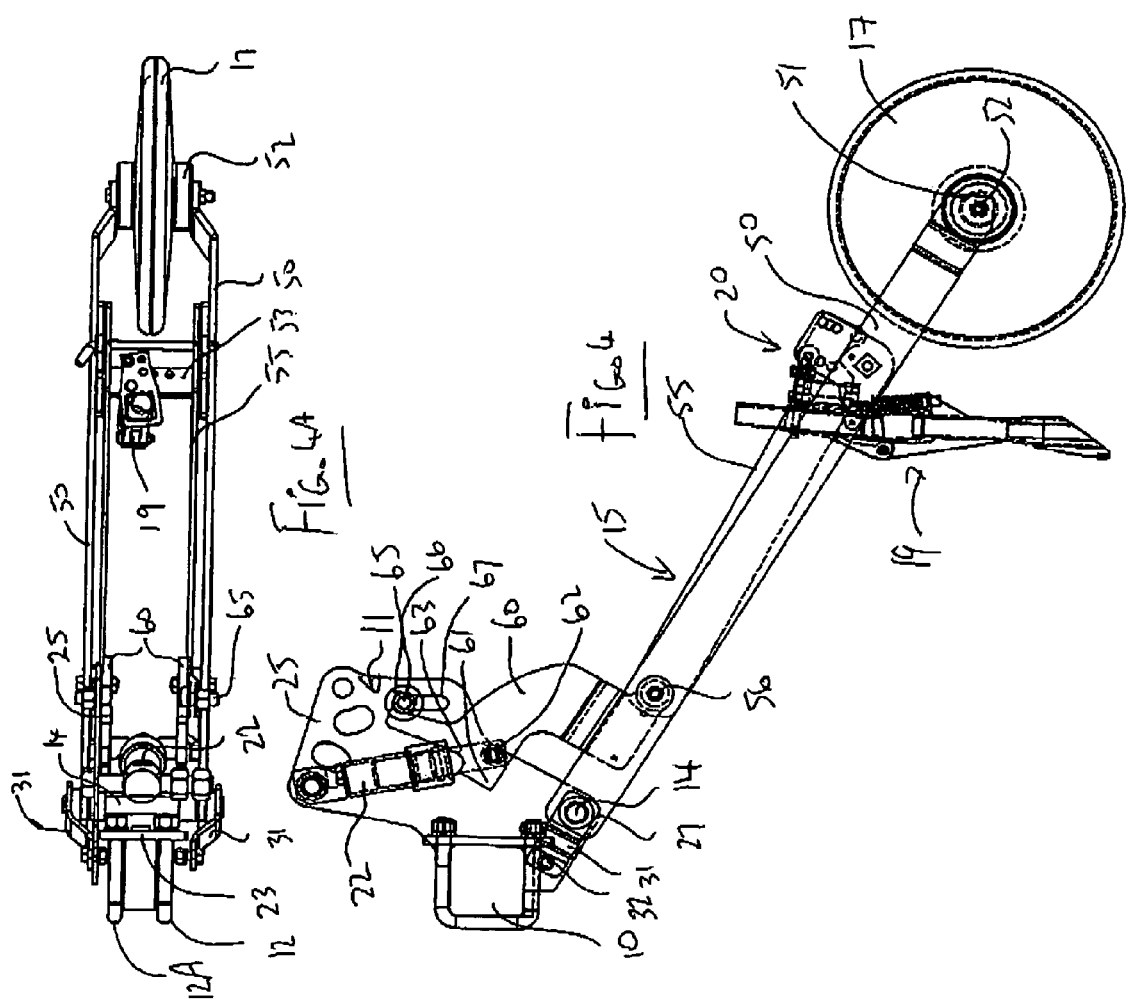

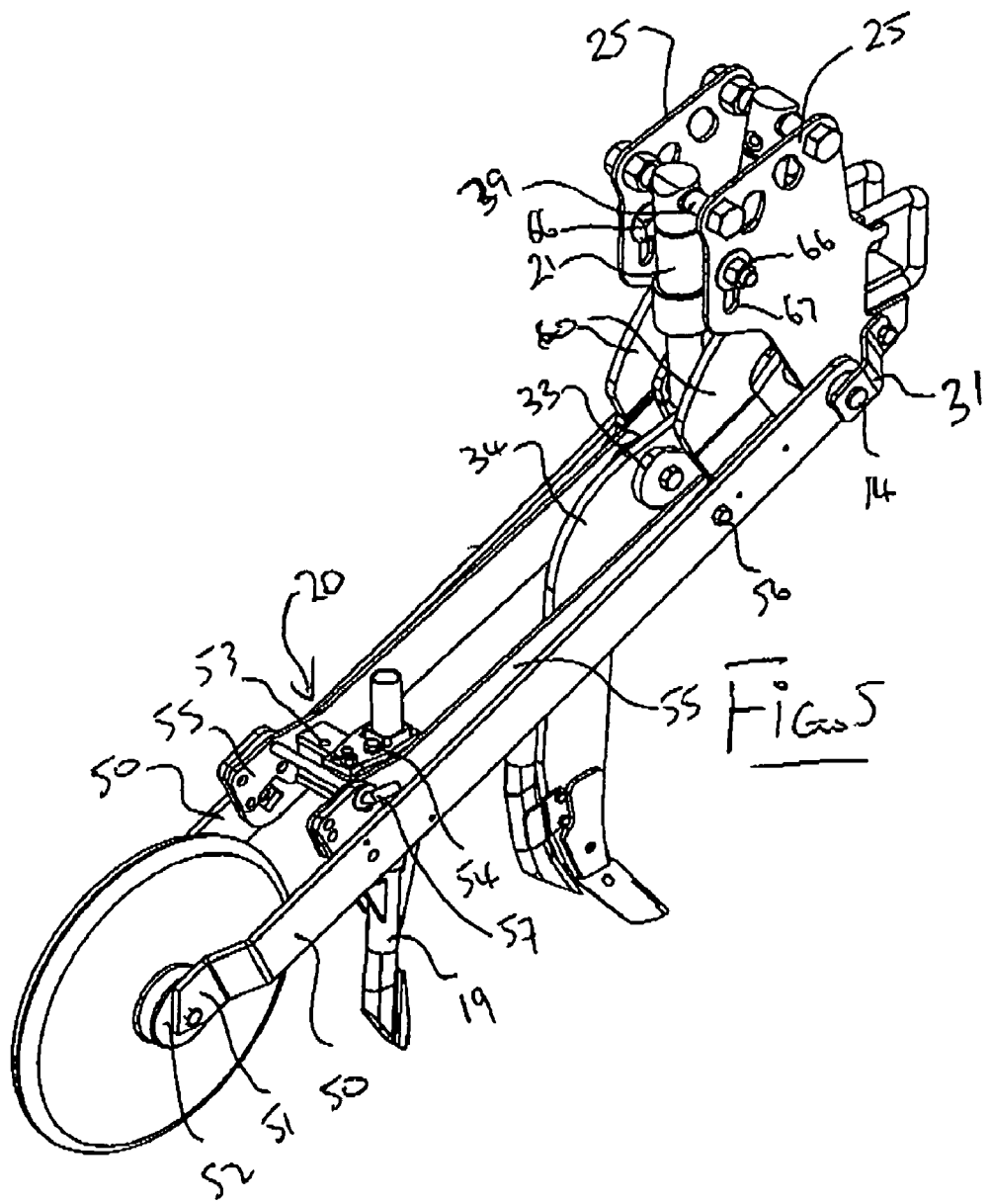

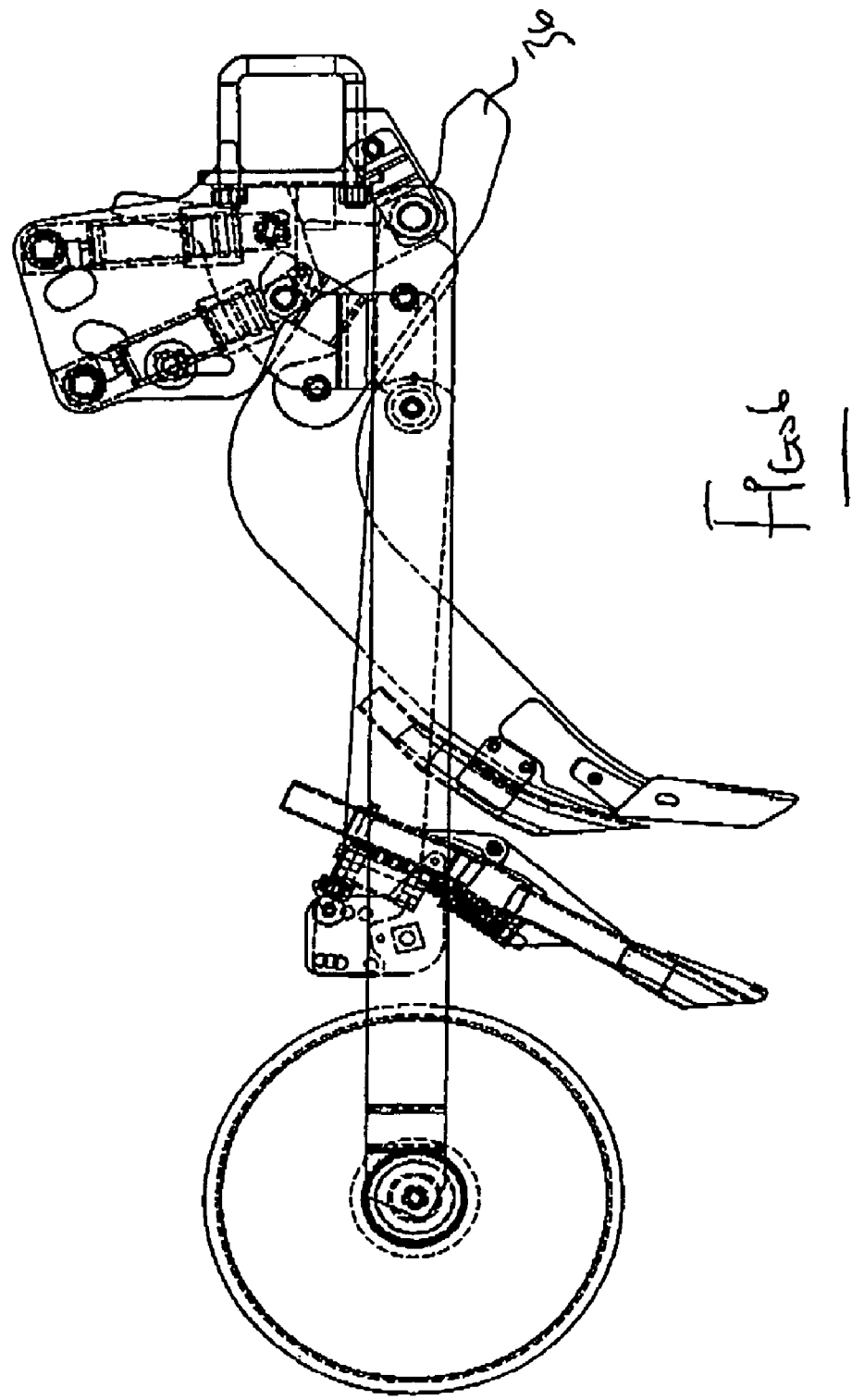

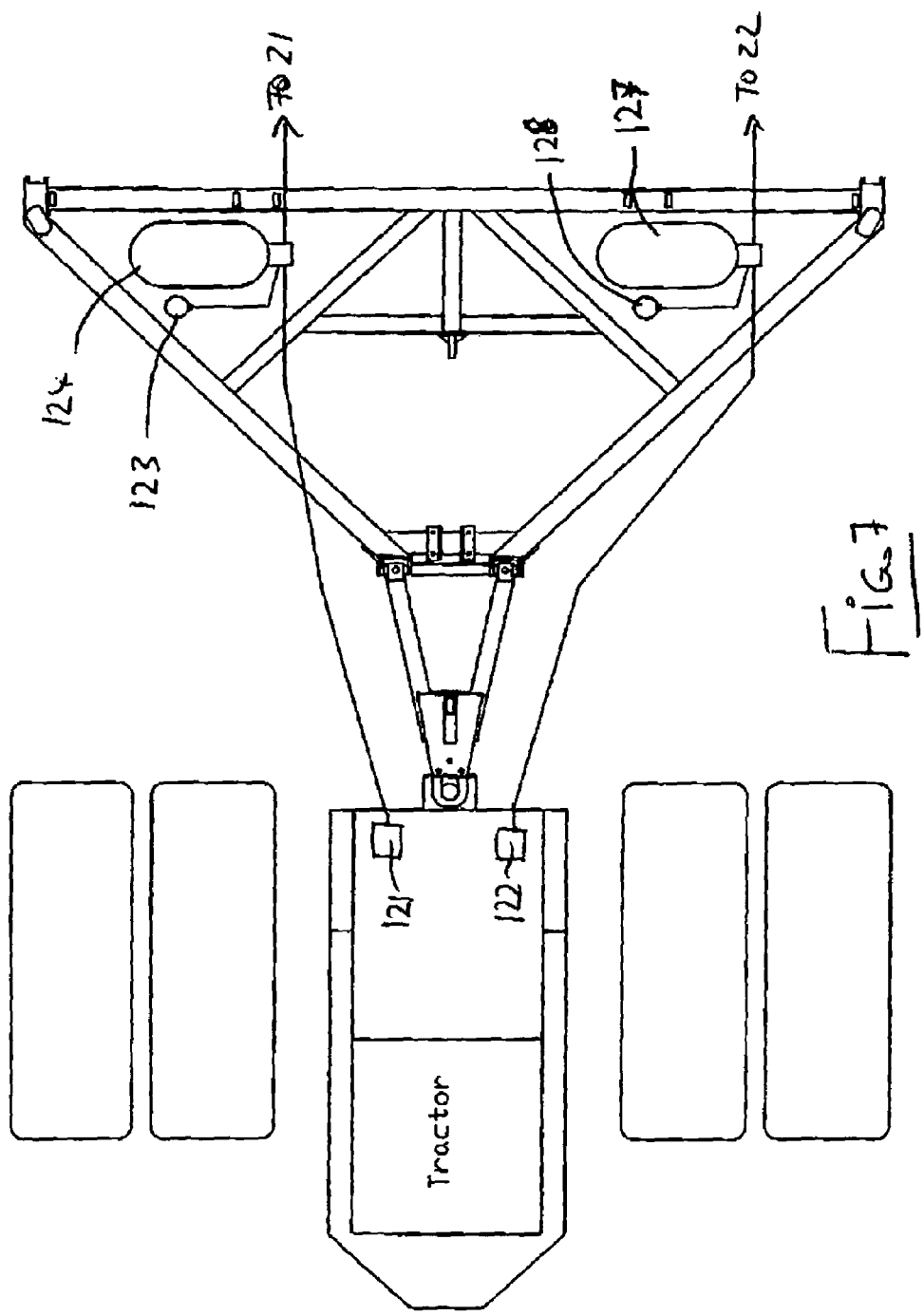

DUAL MATERIAL AGRICULTURAL DELIVERY SYSTEM FOR SEEDER

This invention relates to a dual material agricultural delivery system for use on a seeder and more particularly to a assembly for mounting and for application of ground biasing forces to the components of the system. It will be appreciated that the term "dual" used herein is intended to include the possibility of more than two materials are delivered either through an equal number of delivery openers or in an arrangement in which one of the openers is used to deliver more than one material.

BACKGROUND

The use of a single assembly for mounting on a seeder and dispensing both fertilizer and seed in a single pass is known from prior U.S. Pat. No. 4,762,075 of one of the present inventors (Halford) and from subsequent U.S. Pat. Nos. 5,331,907 and 5,398,851 of Beaujot. Also reference is made to U.S. Pat. No. 6,142,085 of Halford et al which discloses another assembly of the same general type using a hydraulic cylinder to provide the necessary forces and U.S. Pat. No. 5,947,209 of Halford et al which shows a construction of shank for use in a machine of this type.

These assemblies generally include a furrowing element or knife for producing a furrow in the ground as the assembly is pulled across the ground and a fertilizer feed tube for depositing fertilizer directly behind the furrowing element. A second delivery member including a dispensing tube is provided spaced rearwardly of and usually but not necessarily laterally offset from the furrowing element, for depositing the seed in ground spaced at a position preferably offset to one side from the fertilizer and preferably offset above. A packer wheel then follows for providing depth control and packing soil above the seed.

Generally a single biasing element, but in some cases more than one such element, is provided in the above arrangements for urging both the furrowing element and the packer wheel downward to engage the ground. In some known assemblies however the forces are more directed to one element rather than the other. When the forces are not properly distributed, taking into account the ground conditions which may vary widely, the resulting seeding operation becomes less effective. The above patent U.S. Pat. No. 4,762,075 of Halford provides an arrangement using a spring for applying force to the knife and a separate spring for applying forces to the packer and second delivery member. In practice both are adjustable to provide independent adjustment of the separate forces for best control. The above patents of Beaujot provide instead an arrangement using a hydraulic cylinder to apply the force. However these do not allow the distribution of force between the packer wheel and the second distribution member on one assembly and the furrowing element or knife on a second assembly to be adjusted independently and thus the seeder is less suited to varying conditions of the ground to be seeded.

A research machine which was used in the 1960s in Sweden was developed by researchers Heinonen and Huhtapalo provided an arrangement generally of the above type which included a first furrowing element for engaging the ground and for applying fertilizer and the second furrowing element behind and offset to one side from the first for applying seed with the second attached to a packer wheel for guiding the depth of the seed. This machine known as the "Viktoria" machine was used for research but did not lead to any commercial machines of that type with the commercial development arising from the research being directed to alternative types of machines known as "mid row banding". The Viktoria machine mounted the fertilizer element and the seeding/packer element as separate components on a frame with a hydraulically biased rocker shaft applying forces onto the fertilizer component and a spring connected between the packer arm and the frame providing biasing forces on the packer wheel. Drawings of this device are shown in a paper entitled FERTILIZER PLACEMENT FOR SMALL GRAINS by HEINONEN et al dated $15^{th}$ Apr. 1978.

Machines of the above type shown in the Halford and Beaujot patents are generally used for single pass, minimum-tillage seeding and fertilizing. Machines of this type have become widely used and are manufactured under the arrangements as shown in the above patents by the companies Conserva Pak and Seed Hawk. While machines of this general type and as disclosed herein are primarily proposed for minimum tillage applications, it is not essential that they be so used and in many cases the same machine can be used in tillage systems where the conditions of crop residue and soil impaction are less rigorous.

A number of further devices, one example of which is shown in U.S. Pat. No. 5,562,054 of Ryan issued Oct. 8, 1996, include a furrowing element which is engaged into the ground by force from the hydraulic cylinder. The second material delivery system is pivotally mounted on the rear of the shank and floats on a parallel linkage system with a relatively small spring force applied by a mechanical spring. An arrangement of this type has some application in relatively light soils but is unsuitable for wide application and for zero till applications.

SUMMARY

It is one object of the present invention to provide an improved dual (two or more) material delivery assembly for placing agricultural materials in or on the ground.

According to one aspect of the present invention there is provided an apparatus for delivering agricultural materials to the ground comprising:

a frame which is supported for movement in a forward direction over the ground;

a plurality of delivery assemblies mounted on the frame at spaced positions across the frame for delivering the agricultural materials to the ground at spaced positions across the ground as the frame moves over the ground;

each delivery assembly comprising:

a mounting bracket attached to the frame;

a furrow forming element extending generally downward from the bracket to a ground penetrating end arranged to penetrate the ground for producing a furrow as the frame is moved across the ground in the forward direction;

the furrow forming element being pivotally mounted on the mounting bracket for pivotal movement relative thereto about a furrow forming element axis which is horizontal and transverse to the forward direction;

the furrow forming element including a first material delivery conduit located behind the ground penetrating end of the furrow forming element for depositing a first material in the ground rearward of the ground penetrating end of the furrowing element;

a second material delivery member including a second delivery conduit spaced rearward from the furrow forming element and the first material delivery conduit, the second material delivery member having a ground engaging end for depositing a second material in the ground at a position spaced from the first material;

the second material delivery member being pivotally mounted on the mounting bracket for pivotal movement relative thereto independently of the pivotal movement of the furrow forming element about a second material delivery member axis which is horizontal and transverse to the forward direction;

a first force application member connected between the bracket and the furrow forming element for providing a force on the furrow forming element for urging the furrow forming element about the furrow forming element axis to engage the ground; and a second force application member connected between the bracket and the second material delivery member for providing a force on the second material delivery member for urging the second material delivery member about the second material delivery member axis to engage the ground.

Preferably the mounting bracket is fixed to the frame, but it may be free to float or move relative to the frame for example on parallel links.

As set forth above, the above apparatus may include the delivery of more than two materials either using more than two delivery systems or by delivering two materials in one of the delivery systems.

For example, the second material delivery system could include two elements one on each side of a furrow formed by the first delivery system.

Where it is stated above that the bracket is fixedly mounted on the frame, this is intended to include the possibility that it can be readily removed and replaced for example by way of clamping bolts or that it is permanently attached to the frame. The term is intended to be restricted to the fact that the bracket remains fixed in place on the frame during use of the system.

The furrow forming element and the second material delivery member may be similar in construction or may be of different constructions and the use of different terms for these elements is not intended to imply any specific construction.

Preferably there is provided a packer wheel which is mounted on either the furrow forming element or the second material delivery member for engaging the ground. In this way the depth of operation of that element is controlled by the packer wheel. The depth of the other element may be controlled by the height of the frame, but other methods of control may be used. Where the furrow forming element forms the primary furrow and the second element merely runs primarily in the formed furrow, the major forces from the ground are communicated through the furrow forming element so that preferably the packer wheel is attached to the second element rather than the furrow forming element.

Preferably there is provided two stop members each of which is mounted on a respective one of the furrow forming element and the second material delivery member for halting downward movement thereof relative to the bracket. In this way the elements can be prevented from over extending the force application members and can be lifted from the ground by lifting the elements themselves or the frame for transport.

Preferably the first and second force application members each comprise a fluid actuated cylinder which preferably uses hydraulic fluid for higher pressures, but may use air or other fluid.

In one particularly preferred arrangement, the second material delivery member is arranged to be offset laterally and upward from the ground penetrating end of the furrow forming element, which is preferably a knife or narrow hoe opener, for engaging a side of the furrow while running primarily within the furrow and depositing the second material in the ground spaced upward and laterally offset from the first material. Thus the second material delivery member is also preferably narrow so as to deposit the second material substantially in the furrow substantially without increasing the width of the furrow. This construction is particularly applicable for zero till applications. However other arrangements and other furrow forming elements may be used including sweeps, disks, and shovels.

Preferably the first and second force application members are arranged in substantially a common plane at right angles to the frame with one in front of the other.

Preferably the first and second force application members are located and arranged relative to the respective pivot axis so as to provide a greater mechanical advantage for the furrow forming element than for the second material delivery member.

Preferably the furrow forming element axis and the second material delivery member axis are coaxial about a common axis.

Preferably the first force application member is located at a greater distance from the common pivot axis than the second force application member so as to provide a greater mechanical advantage for the furrow forming element than for the second material delivery member.

Preferably the first and second force application members each comprise a fluid actuated or hydraulic cylinder of the same dimensions. This arrangement is convenient mechanically and can be used to provide the different forces required due to the different spacing providing different mechanical advantage but is not essential to the construction since different cylinders can be used.

Preferably the bracket comprises a pair of substantially parallel side plates with the first and second force application members located between the plates. The term "plates" used herein can include a cast structure forming a hollow area between two side portions and is not intended to be limited to fabricated elements.

Preferably the first force application members of the assemblies are interconnected to a first common adjustment system for common adjustment of the force applied thereby and wherein the second force application members of the assemblies are interconnected to a second common adjustment system for common adjustment of the force applied thereby.

Preferably the frame is arranged for connection to a tractor and wherein one or both of the first and second common adjustment systems are located on the tractor for adjustment on the go.

In the alternative, one or both of the first and second common adjustment systems are located on the frame.

Preferably one or both of the first and second common adjustment systems comprises a fluid accumulator located on the frame.

The mounting bracket preferably has the following features or options:

1. Single point of attachment to a frame.
2. Contains a single pivot point about which the two (or more) soil engaging components can rotate.
3. Contains mounting for at least two force generating mechanisms which are centrally adjustable for the complete machine.

The First Opener preferably has the following features or options:

1. Can pivot from the single pivot point attached to the mounting bracket.

2. Can be any type which provides a first opening in the soil to enable placement of one or more products onto or in the soil.

3. The depth and location of the first opener in the soil can be determined by the frame and/or any other depth locating or influencing means.

4. Has its own centrally adjustable force mechanism.

5. Can have one or more delivery means to transport product(s) as required on or into the soil as required.

6. The first opener can have any approach angle to the soil as required for the task.

The Second material delivery member can preferably have the following features or options:

1. At least some parts pivot from the single pivot point on the mounting bracket.

2. Can be of any type which provides a second engaging of the soil as required to place product(s) on or into the soil.

3. Depth and position can be determined by the frame, packer wheel, shoe and/or any combination or other device as required.

4. Has its own centrally adjustable force mechanism.

5. Can have one or more delivery means to transport product(s) as required on or into the soil as required.

6. Position of placement of products by the second opener can be:
  a) With the product(s) delivered by the first opener delivery means.
  b) Above the location of the first opener delivery position
  c) To one side of the first opener delivery position
  d) To one side and above the first opener delivery position
  e) To each side of the first opener delivery position
  f) To each side and above or below the first opener delivery position.

7. The second opener can be any of the following:
  a) Fixed vertically & horizontally
  b) Fixed horizontally—vertical is variable
  c) Fixed vertically—variable horizontally
  d) Variable vertically and horizontally.

8. The second opener could be both a depth controlling and product delivery means.

9. The second opener can operate within the furrow created by the first opener or outside of the furrow created by the first opener.

10. The second opener can have any approach angle to the soil as required for the task.

The packer wheel if used preferably has the following features or options:

1. Can be rigidly attached to the second delivery member.

2. Can pivot relative to the first opener but from the same pivot point.

3. In the alternative the packer wheel could be rigidly attached to the first opener and pivot relative to the second opener.

4. In a further alternative the packer wheel could pivot relative to both the first and second opener.

5. There may be no packer wheel or other gauging and/or packing device.

6. The dimensions and/or shape of the packer wheel or other gauging and/or packing devices can be as required to optimize crop planting results with a minimum soil disturbance planting system in conjunction with selected opener devices.

7. The packer wheel or other soil engaging component such as a skid member or the like can be longitudinally fixed relative to the first and/or second opener or be able to move from side to side as required.

The force application members preferably have the following features or options:

1. The force for any of the components can be provided by a single system with similar system forces (PSI) and with a single adjustment.

2. The force for each component can be provided by separate force generating systems which provides completely independent adjustment and setting.

3. The adjustment of forces can be provided by a single system which can adjust the forces on the first opener in the first instance and then adjust the forces on the, further soil engaging components in a separate step or steps.

4. The force control system can be provided by a system independent of the tractor.

5. The force control system can be fully provided by the tractor.

6. The force control system can be partially independent of and partially dependent on the tractor.

7. The pressure system can be operated with either a continuously generated pressure supply (i.e. live hydraulics, air etc.) or with a non-continuous pressure supply (accumulator, pressure tank, and/or other intermediate pressure storage system.)

8. The pressure system could be hydraulic, air or other fluid systems.

9. The pressure system for the complete opener assembly could be a combination of hydraulic, air or other systems.

The pivot arrangement preferably has the following features or options:

1. Furrow forming element can pivot:
  Relative to the frame
  With the second and other soil engaging components.

2. Second material delivery member can pivot
  Relative to the frame
  Relative to the furrow opener 3. Different components can pivot relative to each other but not be tied to each other.

4. Different components can pivot independent of each other.

The arrangement as described in detail hereinafter may provide one or more of the following features:

1. Independent Force Mechanisms for two or more soil opener systems which is centrally adjustable.

2. Central adjustment can be either while stopped and adjusting settings or while the unit is in motion (i.e. on the go adjustability)

3. The force system can be relatively fixed on one opener system and remotely adjustable on the other opener system(s) during operation.

4. The centrally adjustable force system can accommodate a wide range of different soil opener combinations with widely differing force requirements i.e. low, medium and high draft requirements.

5. The opener systems can accommodate a range of cropping requirements which require different locational placement of one product relative to one or more other products.

6. The same force and linkage means can accommodate a wide range of soil openers and/or soil opener combinations.

7. The forces on a first opener system can be centrally adjusted in the same direction as the forces on other openers or soil engaging components. Alternatively the forces on other openers can be adjusted opposite to the forces on the first opener.

8. Pivotal movement is allowed between the first opener and any other soil engaging components and where the forces on each part of the first opener and other soil engaging components is centrally adjustable as required.

9. The first opener and any other soil engaging components all pivot from a common pivot point but with separate and independently adjustable force systems.

The arrangement as described in detail hereinafter may provide one or more of the following advantages:

1. With independent force mechanisms each opener system can have its force adjusted independent of the other opener at a central point.

2. Adjustment can be a simple independent and self contained force system or from an existing power unit such as a tractor.

3. An operator can adjust each opener system for the soil, moisture and crop requirements as well as any ground obstacles as required. One or more systems can be adjusted "on the go".

4. A simplified force system on a soil opener enables the operator to utilize the complete implement in a wide range of soil conditions.

5. The simple opener and force systems can accommodate a wide range of cropping situations.

6. A single opener linkage and force system could be used by an operator with differing actual, soil opener(s) or with a specific fixed set of opener styles.

7. An operator can achieve the required force levels on each part of the total opener system as required for soil engaging components in a given field and cropping situation.

8. The pivotal movement of the first opener system relative to any other soil engaging components allows each part of the total system to operate with optimum depth and force as required.

9. The common pivot point simplifies the design and apparatus while still permitting independent pivoting of different adjustable forces.

In further embodiments the hydraulic piston cylinders may be replaced with pneumatic cylinders or springs. The pneumatic cylinders and springs can also provide a constant force on the knife and wheel support members while allowing the members to deflect upward in response to ground contours or obstacles in the ground as the assembly is pulled across the ground.

While the second material delivery member is shown hereinafter in effect as only a tube with its lower end engaging the ground, the member may include more structural elements including reinforcing elements on the tube or a second knife which carries a flexible tube thereon.

While the arrangements described hereinafter include only a single second delivery member for depositing seed to one side of the fertilizer, alternative arrangements can include a third seed delivery tube arranged symmetrically relative to the second tube on the opposite side for dual seed delivery. Such arrangements are previously known and where this application refers to a second delivery member, it will be understood that two such second delivery members may be included in the construction described.

BRIEF DESCRIPTION OF THE DRAWINGS

In the accompanying drawings, which illustrate exemplary embodiments of the present invention;

FIG. 1 is a side elevational view of one embodiment of the dual material delivery assembly according to the present invention, showing the elements in operating position on the frame.

FIG. 2 is a top plan view of the embodiment of FIG. 1.

FIG. 3 is a side elevational view of a part only of the embodiment of FIG. 1 showing only the furrow forming element.

FIG. 3A is a top plan view of the components of FIG. 3.

FIG. 4 is a side elevational view of a part only of the embodiment of FIG. 1 showing only the second delivery member.

FIG. 4A is a top plan view of the components of FIG. 4.

FIG. 5 is an isometric view of the embodiment of FIG. 1.

FIG. 6 is a side elevational view of the embodiment of FIG. 1 in a raised tripped position by engagement of the knife with an obstacle.

FIG. 7 is a schematic illustration of a first control circuit showing the frame, a tractor to which the frame is attached and the control system for varying the force applied to the elements on the go.

DETAILED DESCRIPTION

Figure 8:
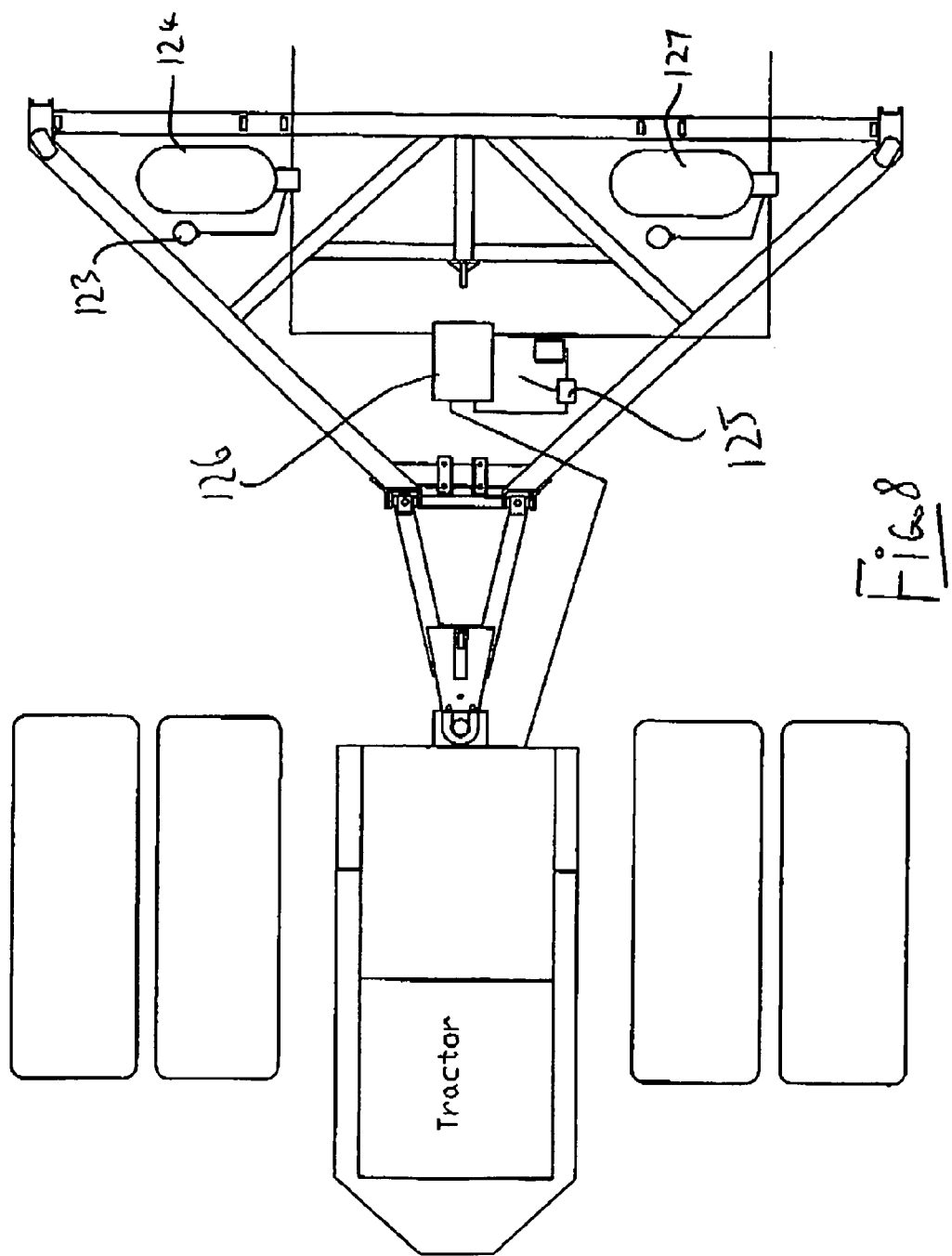
FIG. 8 is a schematic illustration of a second control circuit showing the frame, a tractor to which the frame is attached and the control system for varying the force applied to the elements by manual operation on the frame at a central location.

The complete machine including the frame arranged for attachment to a tractor is shown in FIGS. 7 and 8 and in the remaining figures only one portion of the tool bar of the frame is shown. The frame can be of a conventional nature providing one or more toolbars arranged at right angles to the direction of movement with the toolbar or tool bars including appropriate arrangements to allow suitable spacing of the ground engaging elements as is well known to one skilled in the art. The frame may be of a type which is arranged so that its height can be adjusted or changed for varying the depth of operation of the ground engaging element or for lifting the ground engaging element from the ground. However frames with a fixed height can also be used.

One toolbar is indicated at 10 in FIG. 1 and to which is mounted a bracket 11 using conventional U-shaped clamping bolts 12. On the bracket 11 is mounted firstly a furrow forming element 13 which is mounted for pivotal movement about a pivot member 14. Also mounted for pivotal movement about the pivot member 14 is provided a second ground engaging element 15 including a second delivery member 16 and a packer wheel 17. The furrow forming element 13 includes a material delivery tube 18. The second material delivery member 16 includes a tube 19 and a mounting system 20.

The tubes 18 and 19 may be of the same construction or may be of different construction as required. The tube 18 may be of a flexible hose type nature since it is supported directly on the rear of the furrow forming element 13. The tube 19 as shown comprises a rigid tube structure which is unsupported by additional elements. However it may also be formed as a flexible hose with a supporting front member which may be similar to the furrow forming element 13 or may be of a reduced structural nature depending upon requirements.

The furrow forming element 13 is biased into engagement with the ground by a first force application member 21 and the second ground engaging element 15 is biased downwardly toward the ground by a second force application member 22. In the embodiment shown, both of the force application members are formed from cylinders with a suitable fluid, in most cases a hydraulic fluid, applying pressure to the system within the cylinder to bias the respective element toward the ground.

The arrangement as shown is of the type shown in the above mentioned Hatford U.S. Pat. No. 4,762,075 so that it includes a furrow forming element including a first material delivery conduit, a second ground engaging member including a second conduit and a packer wheel which are arranged in a row one generally behind the other and mounted from a common mounting on the frame. The construction as shown herein therefore may take many of the features and components described in the above mentioned Halford patent, the disclosure of which can be referred to for further details of the structure disclosed herein.

However the arrangement as shown can also be modified in many different ways to incorporate different components and different spacings.

In FIGS. 3 and 4, it will be noted that for convenience of illustration each of the furrow forming element 13 and the second engaging element 15 are shown separately so that the respective components can be seen more easily in the side elevational view.

Thus turning firstly to FIGS. 3 and 3A the shape and arrangement of the brackets can be seen in most detail. Thus the bracket comprises a flat plate 23 which lies against the rear surface of the frame toolbar 10 and is clamped onto that rear surface by two U-shaped bolts 12 which extend through holes in the plate and are held in place by nuts 24. The bracket further comprises a pair of upstanding main support plates 25 which extend upwardly above the plate 23 to a top edge 26. The plates 25 are at right angles to the plate 23 and extend rearwardly from the plate 23 that is to a position behind the toolbar 10. The plates 25 also extend downwardly below the plate 23 and rearwardly from the plate 23 to a bottom apex 27. The bottom apex is thus spaced below the tool bar 10 by a distance sufficient to receive the pivot mounting member 14 which spans across between the plates. From the apex 27, the plates 25 extend upwardly and forwardly along a bottom edge 28 to a front edge 29 underneath the toolbar 10.

The bracket 11 further includes a tongue 30 which extends from the plate 23 underneath the toolbar 10. The bracket 11 further includes a pair of side members 31 which are bolted to the front portion of the side plates 25 underneath the toolbar 10 at a coupling 32 and extend therefrom downwardly and rearwardly to the pivot 14. Each of the members 31 is cranked so that it extends outwardly away from the plate 25 to accommodate the full length of the pivot member 14 which projects through the plates 25 outwardly beyond the plates 25 to provide support for the second ground engaging member 15 as described in more detail hereinafter.

The pivot member 14 is thus mounted on the members 31 and on the plates 25 and extends horizontally there across at a position just underneath and rearwardly of the tool bar 10 and provides pivotal support for both the furrow forming element as shown in FIGS. 3 and 3A and for the second ground engaging member as shown in FIGS. 4 and 4A and described in more detail hereinafter.

In FIGS. 3 and 3A, the furrow forming element comprises a pair of mounting plates 33 which clamp between them the main shank 34 of the furrow forming element. The plates 33 extend to a portion 35 mounted on the pivot member 14. The plates 33 also extend rearwardly beyond the pivot member 14 to an abutting portion 36 which is arranged to engage the tongue 30 in the downward position of the ground engaging member that is the position which is the furthest position which the ground engaging member can reach in the clockwise direction of turning around the pivot 14. The plates 33 are also bent outwardly at the top to form a device 36 for receiving a lower end 37 of the piston of the cylinder 21. A pin 38 extends across the two sides of the device 36 and connects the piston rod 37 to the plates 33. An upper end of the cylinder 21 is attached by a transverse pin 39 to the plates 25 at an upper rearward apex 40 thereof.

The cylinder 21 is a single acting cylinder acting to push downwardly on the device 36 of the plates 33 so as to bias the shank 34 in the clockwise direction around the pivot 14 for engagement of the furrow forming member into the ground.

The shank 34 carries a knife 41 and carries the tube or conduit 18 both in conventional manner. The shank and knife construction are generally of the type shown in the prior U.S. Pat. No. 5,947,029 of Halford so that both the knife and the shank are formed from a plate which is cut to shape and provides sufficient rigidity to prevent side to side bending of the shank and the knife during action but allows same flexibility. However conventional knife constructions can be provided which bolt onto the shank in a conventional manner.

Counterclockwise or lifting movement of the ground engaging member is halted at a predetermined position also by a suitable stop arrangement. The stop can be provided at any suitable location on the structure but in the example shown is provided by a first abutting member 43 on the shank 34 which butts against a projection 44 mounted on the plate 23.

The angle of the cylinder 21 relative to the device 36 and the mounting pin 40 is such that it tends to move along an arc around an axis defined by the pivot member 14 and to push generally along a tangent to that arc.

Turning now to second ground engaging element as shown in FIGS. 4 and 4A, this generally comprises a pair of arms 50 which are located outwardly of the plates 33 of the furrow forming element and outwardly of the plates 25 of the bracket so as to be mounted on the pivot member 14 at the outer ends thereof for pivotal movement about the same axis as the pivotal movement of the furrow forming element as defined by the pivot member 14. The arms 50 extend from the pivot member 14 downwardly and rearwardly in a straight line to a bottom end 51 at which is located at a bearing 52 for the packer wheel 17. Thus the arms 50 can generally pivot upwardly and downwardly and their height is controlled by the engagement of the packer wheel 17 on the ground.

Between the arms 50 is mounted the tube 19 on the mounting assembly 20. The tube 19 is mounted for adjustment movement in a horizontal side to side direction relative to the arms 50 and also in a vertical up and down direction relative to the arms 50. This mounting includes a mounting block 53 on which the tube 19 is carried for side to side movement by adjustment of suitable mounting bolts 54. The block 53 is carried on a pair of side arms 55 which lie along the inside surface of the arms 50 up to a mounting pin 56 adjacent to but spaced downwardly from the pivot pin 14. Thus upward and downward movement of the block 53 relative to the arm 50 is controlled by pivotal movement of the arms 55 which are then attached to the arms 50 at a suitable location by application through selected ones of mounting holes of a pin.

The arms 55 could be omitted and the block 53 mounted directly on the arms 50. However the presence of the arms 55 allows the adjustment to be effected more quickly and more simply since the block 53 is not loose between the arms 55 when the pin 57 is removed but is held in place on pivots in a controlled manner upwardly and downwardly until the pin 57 is replaced at the required location.

The arms 50 also carry actuating arms 60 which extend therefrom upwardly to co-operate with the cylinder 22 and with the plates 25 of the bracket 11. Thus the arms 60 include a first portion 61 which carry a pin 62 connected across the lower end of the piston rod 63 of the cylinder 62 for application of force from the cylinder 22 in a clockwise direction onto the second ground engaging member around the pivot member 14. Also the actuating arms 60 include a second portion 65 extending upwardly and rearwardly from the portion 61 with the portion 65 carrying a locating pin 66 which connects between each of the arms 60 and the respective plate 25. A slot 67 in the plate 25 acts to control the length of movement of the actuating arm 60 and therefore the extent of pivotal movement of the arms 50 around the pivot member 14.

The tube 19 can comprise a simple rigid tube or can comprise a flexible tube supported by a structural member. Also the tube can be of a construction shown in the early Halford U.S. Pat. No. 4,762,075. A further design of shank which can be used is shown in the above U.S. Pat. No. 5,947,209 of Halford et al. Further details of this construction can be obtained from one or other of the above patents. Other designs can also be used as will be well known to one skilled in the art.

The cylinder 22 thus provides a biasing force on the arms 60 thus tending to press the packer wheel onto the ground to a predetermined pressure as controlled by adjustment of the pressure on the cylinder 22. It will be noted that the cylinder 22 is located at a shorter radial distance from the pivot 14 relative to the cylinder 21 so that the mechanical advantage obtained by the cylinder 21 is greater than that obtained by the cylinder 22 thus applying a greater force at the same pressure. The pressure can of course be adjusted independently but the greater mechanical advantage is provided so that the primary force applied to the system is through the furrow forming element. The two cylinders are mounted on a common plane at right angles to the tool bar 10 and located between the plates 25 of the bracket. The cylinder 22 is inclined downwardly and rearwardly to a greater angle than the cylinder 21 in order that the force applied to the arms 60 is primarily tangential to the arc of movement thereof around the pivot 14.

Turning now to FIG. 7, there is shown schematically the construction of the implement including a part of the frame and the tractor. Each of the ground engaging elements (not shown for convenience of illustration) is of course of the construction as previously described and is mounted on the tool bar of the frame at the required location to provide the spacing desired for the seeding system. The frame portion shown is the hitch portion for connection to a conventional tool bar which includes components for supplying the first and second materials to the tubes 18 and 19 which is not shown for convenience of illustration.

What is shown is the adjustment system for the pressure applied to the cylinders 21 and 22. In FIG. 7 this is shown as an arrangement including adjustable valves 121 and 122 mounted on the tractor for on the go adjustment. The fluid from the tractor mounted valve 121, 122 is supplied to an accumulator 124, 127 the pressure of which is monitored by a gauge 123, 128. The adjustment can be provided for only one of the sets of cylinders. Thus for example the pressure applied to the cylinders 21 for the furrow forming element can be adjusted on the go by the valve 121 and the pressure applied to the cylinders 22 for the packer wheels can remain at a fixed condition. The system can also be set up for the opposite adjustment.

In FIG. 8 is shown an arrangement in which adjustment is effected centrally but periodically. Thus each of the sets of cylinders 21 and 22 has an accumulator 124, 127 as previously described. However the accumulators are connected to a hand pump 125 and a hydraulic control block 126 which controls the pressure from the tractor hydraulics or the hand pump to provide a fixed but adjustable pressure to each of the accumulators 124 and 127 for the cylinders 21 and 22. Thus the operator can adjust the amount of pressure by adding or releasing gas from the accumulators 124, 127 independently. In the embodiment shown in FIG. 8 the cylinders 21 are connected to a common accumulator 124 and the cylinders 22 are connected to a common accumulator 127. These accumulators can be independently adjusted for independent adjustment of the cylinders 21 and 22 respectively. Alternatively one of the sets of cylinders can be adjusted by an accumulator on the frame and the other adjusted on the go by connection to a valve 121, 122 on the tractor as previously described.

While some embodiments of the present invention have been described in the foregoing, it is to be understood that other embodiments are possible within the scope of the invention. The invention is to be considered limited solely by the scope of the appended claims.

What is claimed is:

1. Apparatus for delivering agricultural materials to the ground comprising:

a frame which is supported for movement in a forward direction over the ground;

a plurality of delivery assemblies mounted on the frame at spaced positions across the frame for delivering the agricultural materials to the ground at spaced positions across the ground as the frame moves over the ground;

each delivery assembly comprising:

a mounting bracket attached to the frame;

a furrow forming element extending generally downward from the bracket to a ground penetrating end arranged to penetrate the ground for producing a furrow as the frame is moved across the ground in the forward direction;

the furrow forming element being pivotally mounted on the mounting bracket for pivotal movement relative thereto about a furrow forming element axis which is horizontal and transverse to the forward direction;

the furrow forming element including a first material delivery conduit located behind the ground penetrating end of the furrow forming element for depositing a first material in the ground rearward of the ground penetrating end of the furrowing element;

a second material delivery member including a second delivery conduit spaced rearward from the furrow forming element and the first material delivery conduit, the second material delivery member having a ground engaging end for depositing a second material in the ground at a position spaced from the first material;

the second material delivery member being pivotally mounted on the mounting bracket for pivotal movement relative to the mounting bracket about a second material delivery member axis which is horizontal and transverse to the forward direction;

the pivotal mounting of the furrow forming element being arranged relative to the pivotal mounting of the second material delivery member such that the pivotal movement of the furrow farming element on the mounting bracket is independent of the pivotal movement of the second material delivery member on the mounting bracket and vice versa;

a first force application member connected between the bracket and the furrow forming element for providing a force on the furrow forming element for urging the furrow forming element about the furrow forming element axis to engage the ground; and a second force application member connected between the bracket and the second material delivery member for providing a force on the second material delivery member for urging the second material delivery member about the second material delivery member axis to engage the ground.

2. The apparatus according to claim 1 wherein there is provided a packer wheel which is mounted on either the furrow forming element or the second material delivery member for engaging the ground.

3. The apparatus according to claim 2 wherein the packer wheel is connected to the second material delivery member.

4. The apparatus according to claim 1 wherein there is provided two stop members each of which is mounted on a respective one of the furrow forming element and the second material delivery member for halting downward movement thereof relative to the bracket.

5. The apparatus according to claim 4 wherein the stop members are arranged to engage components of the bracket.

6. The apparatus according to claim 1 wherein the second material delivery member is arranged to be offset laterally and upward from the ground penetrating end of the furrow forming element for engaging a side of the furrow and depositing the second material in the ground spaced upward and laterally offset from the first material.

7. The apparatus according to claim 1 wherein the furrow forming element is a narrow hoe opener.

8. The apparatus according to claim 1 wherein the second material delivery member is narrow so as to deposit the second material substantially in the furrow substantially without increasing the width of the furrow.

9. The apparatus according to claim 1 wherein the first and second force application members are arranged in substantially a common plane at right angles to the frame with one in front of the other.

10. The apparatus according to claim 1 wherein the first and second force application members are located and arranged relative to the respective pivot axis so as to provide a greater mechanical advantage for the furrow forming element than for the second material delivery member.

11. The apparatus according to claim 1 wherein the bracket comprises a pair of substantially parallel side plates with the first and second force application members located between the plates.

12. Apparatus for delivering agricultural materials to the ground comprising:

a frame which is supported for movement in a forward direction over the ground;

a plurality of deliver assemblies mounted on the frame at spaced positions across the frame for delivering the agricultural materials to the ground at spaced positions across the ground as the frame moves over the ground;

each delivery assembly comprising:

a mounting bracket attached to the frame;

a furrow forming element extending generally downward from the bracket to a around penetrating end arranged to penetrate the ground for producing a furrow as the frame is moved across the ground in the forward direction;

the furrow forming element being pivotally mounted on the mounting bracket for pivotal movement relative thereto about a furrow forming element axis which is horizontal and transverse to the forward direction;

the furrow forming element including a first material delivery conduit located behind the ground penetrating end of the furrow forming element for depositing a first material in the ground rearward of the ground penetrating end of the furrowing element;

a second material delivery member including a second delivery conduit spaced rearward from the furrow forming element and the first material delivery conduit, the second material delivery member having a ground engaging end for depositing a second material in the ground at a position spaced from the first material;

the second material delivery member being pivotally mounted on the mounting bracket for pivotal movement relative thereto independently of the pivotal movement of the furrow forming element about a second material delivery member axis which is horizontal and transverse to the forward direction;

a first force application member connected between the bracket and the furrow forming element for providing a force on the furrow forming element for urging the furrow forming element about the furrow forming element axis to engage the ground; and a second force application member connected between the bracket and the second material delivery member for providing a force on the second material delivery member for urging the second material delivery member about the second material delivery member axis to engage the ground;

wherein the first force application member each comprises a first fluid actuated cylinder and the second force application member comprises a second fluid actuated cylinder, the second fluid actuated cylinder being separate from and independent of the first fluid actuated cylinder.

13. The apparatus according to claim 12 wherein the second material delivery member is arranged to be offset laterally and upward from the ground penetrating end of the furrow forming element for engaging a side of the furrow and depositing the second material in the ground spaced upward and laterally offset from the first material.

14. The apparatus according to claim 12 wherein the furrow forming element is a narrow hoe opener.

15. The apparatus according to claim 12 wherein the second material delivery member is narrow so as to deposit the second material substantially in the furrow substantially without increasing the width of the furrow.

16. The apparatus according to claim 12 wherein the first and second force application members are arranged in substantially a common plane at right angles to the frame with one in front of the other.

17. The apparatus according to claim 12 wherein the first and second force application members are located and arranged relative to the respective pivot axis so as to provide a greater mechanical advantage for the furrow forming element than for the second material delivery member.

18. Apparatus for delivering a agricultural materials to the ground comprising:

a frame which is supported for movement in a forward direction over the ground;

a plurality of delivery assemblies mounted on the frame at spaced positions across the frame for delivering the agricultural materials to the ground at spaced positions across the ground as the frame moves over the ground;

each delivery assembly comprising:

a mounting bracket attached to the frame;

a furrow forming element extending generally downward from the bracket to a ground penetrating end arranged to penetrate the ground for producing a furrow as the frame is moved across the ground in the forward direction;

the furrow forming element being pivotally mounted on the mounting bracket for pivotal movement relative thereto about a furrow forming element axis which is horizontal and transverse to the forward direction;

the furrow forming element including a first material delivery conduit located behind the ground penetrating end of the furrow forming element for depositing a first material in the ground rearward of the ground penetrating end of the furrowing element;

a second material delivery member including a second delivery conduit spaced rearward from the furrow forming element and the first material delivery conduit, the second material delivery member having a ground engaging end for depositing a second material in the ground at a position spaced from the first material;

the second material delivery member being pivotally mounted on the mounting bracket for pivotal movement relative thereto independently of the pivotal movement of the furrow forming element about a second material delivery member axis which is horizontal and transverse to the forward direction;

a first force application member connected between the bracket and the furrow forming element for providing a force on the furrow forming element for urging the furrow forming element about the furrow forming element axis to engage the ground; and a second force application member connected between the bracket and the second material delivery member for providing a force on the second material delivery member for urging the second material delivery member about the second material delivery member axis to engage the ground;

wherein the furrow forming element axis and the second material delivery member axis are coaxial about a common pivot axis.

19. The apparatus according to claim 18 wherein the first force application member is located at a greater distance from the common pivot axis than the second force application member so as to provide a greater mechanical advantage for the furrow forming element than for the second material delivery member.

20. Apparatus according to claim 19 wherein the first and second force application members each comprise a fluid actuated cylinder of the same dimensions.

21. The apparatus according to claim 18 wherein the second material delivery member is arranged to be offset laterally and upward from the ground penetrating end of the furrow forming element for engaging a side of the furrow and depositing the second material in the ground spaced upward and laterally offset from the first material.

22. The apparatus according to claim 18 wherein the furrow forming element is a narrow hoe opener.

23. The apparatus according to claim 18 wherein the second material delivery member is narrow so as to deposit the second material substantially in the furrow substantially without increasing the width of the furrow.

24. The apparatus according to claim 18 wherein the first and second force application members are arranged in substantially a common plane at right angles to the frame with one in front of the other.

25. The apparatus according to claim 18 wherein the first and second force application members are located and arranged relative to the respective pivot axis so as to provide a greater mechanical advantage for the furrow forming element than for the second material delivery member.

26. Apparatus for delivering agricultural materials to the ground comprising:

a frame which is supported for movement in a forward direction over the ground;

a plurality of delivery assemblies mounted on the frame at spaced positions across the frame for delivering the agricultural materials to the ground at spaced positions across the ground as the frame moves over the ground;

each delivery assembly comprising:

a mounting bracket attached to the frame;

a furrow forming element extending generally downward from the bracket to a ground penetrating end arranged to penetrate the ground for producing a furrow as the frame is moved across the ground in the forward direction;

the furrow forming element being pivotally mounted on the mounting bracket for pivotal movement relative thereto about a furrow forming element axis which is horizontal and transverse to the forward direction;

the furrow forming element including a first material delivery conduit located behind the ground penetrating end of the furrow forming element for depositing a first material in the ground rearward of the ground penetrating end of the furrowing element;

a second material delivery member including a second delivery conduit spaced rearward from the furrow forming element and the first material delivery conduit, the second material delivery member having a ground engaging end for depositing a second material in the ground at a position spaced from the first material;

the second material delivery member being pivotally mounted on the mounting bracket for pivotal movement relative thereto independently of the pivotal movement of the furrow forming element about a second material delivery member axis which is horizontal and transverse to the forward direction;

a first force application member connected between the bracket and the furrow forming element for providing a force on the furrow forming element for urging the furrow forming element about the furrow forming element axis to engage the ground; and a second force application member connected between the bracket and the second material delivery member for providing a force on the second material delivery member for urging the second material delivery member about the second material delivery member axis to engage the ground;

wherein the first force application members of the assemblies are interconnected to a first common adjustment system for common adjustment of the force applied thereby and wherein the second force application members of the assemblies are interconnected to a second common adjustment system for common adjustment of the force applied thereby, the first and second common adjustment systems being independently adjustable.

27. The apparatus according to claim 26 wherein the frame is arranged for connection to a tractor and wherein one or both of the first and second common adjustment systems are located on the tractor for adjustment on the go.

28. The apparatus according to claim 26 wherein one or both of the first and second common adjustment systems are located on the frame.

29. The apparatus according to claim 26 wherein the first force application member comprises a first fluid actuated cylinder and the second force application member comprises a second fluid actuated cylinder and wherein each of the first and second common adjustment systems comprises a fluid accumulator located on the frame.

30. The apparatus according to claim 26 wherein the second material delivery member is arranged to be offset laterally and upward from the ground penetrating end of the furrow forming element for engaging a side of the furrow and depositing the second material in the ground spaced upward and laterally offset from the first material.

31. The apparatus according to claim 26 wherein the furrow forming element is a narrow hoe opener.

32. The apparatus according to claim 26 wherein the second material delivery member is narrow so as to deposit the second material substantially in the furrow substantially without increasing the width of the furrow.

33. The apparatus according to claim 26 wherein the first and second force application members are arranged in substantially a common plane at right angles to the frame with one in front of the other.

34. The apparatus according to claim 26 wherein the first and second force application members are located and arranged relative to the respective pivot axis so as to provide a greater mechanical advantage for the furrow forming element than for the second material delivery member.

* * * * *